No. 893,467.
PATENTED JULY 14, 1908.
C. EISENSCHMID.
VENTILATOR.
APPLICATION FILED MAR. 23, 1908.
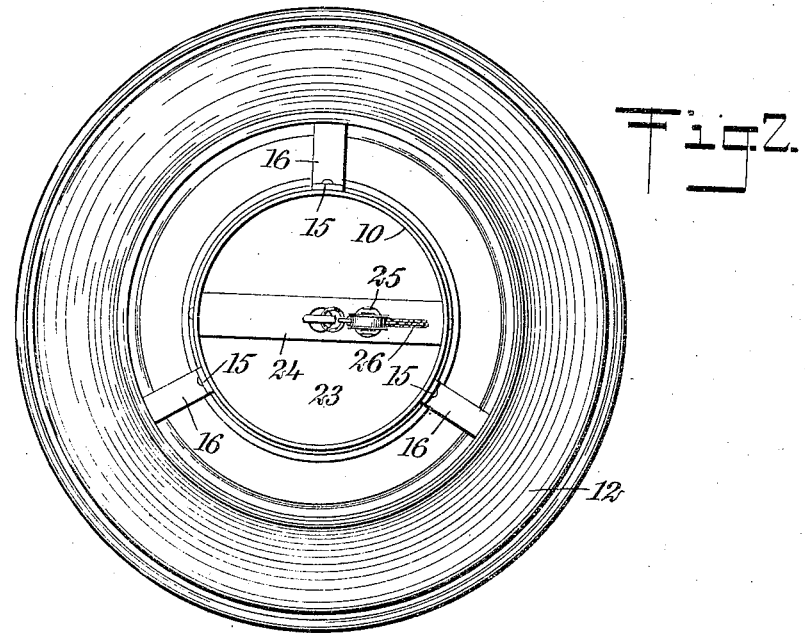
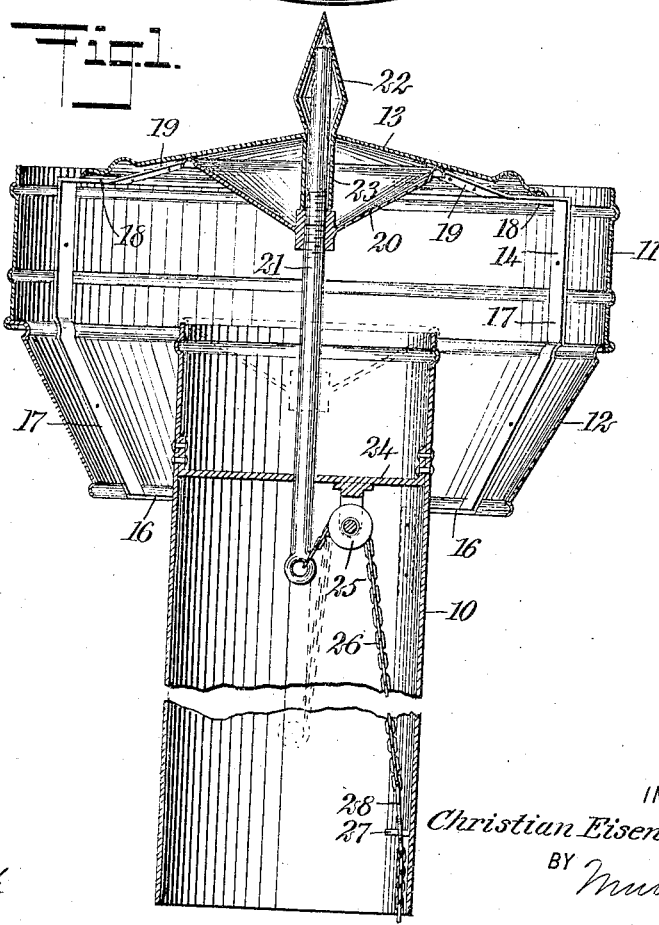
WITNESSES
INVENTOR
Christian Eisenschmid
BY
ATTORNEYS

UNITED STATES PATENT OFFICE.

CHRISTIAN EISENSCHMID, OF NEW YORK, N. Y.

VENTILATOR.

No. 893,467. Specification of Letters Patent. Patented July 14, 1908.

Application filed March 23, 1908. Serial No. 422,661.

*To all whom it may concern:*

Be it known that I, CHRISTIAN EISENSCHMID, a citizen of the United States, and a resident of the city of New York, borough of Manhattan, in the county and State of New York, have invented a new and Improved Ventilator, of which the following is a full, clear, and exact description.

This invention relates to certain improvements in ventilators, and more particularly to that type of ventilator commonly employed above the roofs of buildings, for permitting the escape of foul air from the building. This type of device usually includes a ventilator tube, a roof or cover above the open end thereof and spaced therefrom to permit the escape of air but prevent the entrance of rain, a wind shield encircling both the tube and the roof or cover but spaced from each, and a valve or damper for controlling the flow of air through the tube.

My invention relates especially to the means for supporting and operating the damper or valve, and involves the use of a longitudinally-movable rod supported in guides at opposite ends thereof and having the damper or valve secured to said rod intermediate the guides.

Reference is to be had to the accompanying drawings, forming a part of this specification, in which similar characters of reference indicate corresponding parts in both the figures, and in which Figure 1 is a central longitudinal section through a ventilator constructed in accordance with my invention; and Fig. 2 is an inverted plan view thereof.

In the specific form of ventilator illustrated in the drawings, I employ a ventilator tube 10, adapted to extend through the roof of the building to be ventilated and permit of the escape of air therethrough from a room to the outside atmosphere. At the upper open end of the tube, I provide a wind shield, including a cylindrical section 11 and a conical section 12. The cylindrical section extends above the end of the tube, while the conical section 12 is connected directly to the lower end of the cylindrical section and extends inwardly toward the tube at a short distance below the open end of the latter. Directly above the end of the tube, I provide a roof or cover 13, preferably conical in form and of greater diameter than the tube but of less diameter than the cylindrical portion 11 of the wind shield. The edges of the conical top are disposed below and within the upper edge of the wind shield. The conical top 13 and the wind shield are rigidly supported and secured in place by a plurality of straps 14, each having a lower end portion 15 secured to the outer surface of the tube, a transverse portion 16 extending from the tube to the lower edge of the cone 12, an upwardly-extending portion 17 secured to the inner surface of the wind shield, a transverse portion 18 connecting the upper portion of the wind shield to the conical top 13, and a terminal portion 19 secured to the inner surface of the latter. As many of these straps may be employed as necessary, there being three used in the form illustrated. These straps serve to rigidly support the wind shield and top and hold them in their spaced relationship.

For closing the upper end of the tube, I provide a damper or valve 20, conical in form and having its depressed center rigidly secured to a valve rod 21. The outer edge of the valve plate is preferably provided with a downturned flange forming a bead or groove into which the edge of the tube extends to form a tight closure. The valve is secured to the rod 21, intermediate the ends of the latter, and means are provided for supporting and guiding both ends of the rod. The upper end of the rod is supported and guided by the conical top 13, which carries a hollow ornamental knob 22 at the apex thereof. The lower end of the knob is open and of a size adapting it to receive the upper end of the rod 21.

Within the top 13 and extending downwardly therefrom, is a sleeve 23 in alinement with the opening in the knob and also serving to receive and guide the rod. The lower end of the rod is supported and guided by a transverse bar 24 within the upper end of the tube, said bar being rigidly secured to the tube and having an aperture adapted to receive the rod. On the under surface of the rod 24 is mounted a suitable pulley 25, over which a chain 26 may extend. One end of the chain is connected to the lower end of the rod and the other end of the chain extends down the tube to a point from which it may be readily operated to raise the rod and valve. By pulling downward on the chain, the rod and valve are raised into engagement with the under surface of the roof and air may freely escape from the tube. By releasing the chain, the weight of the valve and rod causes them to descend and close the opening. The chain may be fastened in any suitable manner to hold the valve open, as, for instance, a hook 27 may be provided on the inner surface of the tube, and, if desired, a safety link 28 may be inserted in the chain and formed of fusible metal, so that in case a fire should occur, the link would be melted and the valve or damper automatically closed.

Having thus described my invention, I claim as new and desire to secure by Letters Patent:

1. In combination, a ventilator tube, a valve for closing the end thereof, a rod extending through said valve and serving to support the latter, a guide within the tube for one end of the rod, a roof above the end of the tube but spaced therefrom and serving as a guide for the opposite end of the rod, and means for moving said rod longitudinally to open or close the valve.

2. In combination, a ventilator tube, a conical roof extending over the end of said tube but spaced therefrom, a hollow knob at the apex of said tube and having the interior thereof communicating with the space beneath said roof, a valve for closing the end of said tube, a valve rod extending through said valve and supporting the latter, a transverse rod extending across the tube below the valve and serving as a guide for the valve rod, a pulley supported on the under side of said rod, and means secured to the lower end of the valve rod and extending over said pulley for moving said valve rod longitudinally to open said valve, said knob serving to receive and guide the upper end of the valve rod when the latter is in its raised position.

In testimony whereof I have signed my name to this specification in the presence of two subscribing witnesses.

CHRISTIAN EISENSCHMID.

Witnesses:
EVERARD B. MARSHALL,
CLAIR W. FAIRBANKS.